United States Patent [19]

Stockburger et al.

[11] Patent Number: 4,650,979

[45] Date of Patent: Mar. 17, 1987

[54] METHOD FOR THE DETECTION OF AUTHENTICITY IN A DATA CARRIER AND APPARATUS FOR APPLYING SAID METHOD

[76] Inventors: Hermann Stockburger, Kirnachweg 7, D-7742 St. Georgen; Siegfried Bauer, Kussenhofstr. 16, D-7743 Furtwangen, both of Fed. Rep. of Germany

[21] Appl. No.: 308,500

[22] Filed: Oct. 5, 1981

[30] Foreign Application Priority Data

Oct. 13, 1980 [DE] Fed. Rep. of Germany ....... 3038602

[51] Int. Cl.⁴ .............................................. H01Q 9/00
[52] U.S. Cl. .................... 235/455; 235/493; 235/380; 235/454; 382/50; 250/205; 340/825.34
[58] Field of Search ............... 235/454, 474, 458, 493, 235/488, 382, 380, 375, 455; 340/825.3, 825.33, 825.34, 825.35; 250/205; 382/50

[56] References Cited

U.S. PATENT DOCUMENTS

| | | | |
|---|---|---|---|
| 3,449,585 | 6/1969 | Trehub | 250/219 |
| 3,782,543 | 1/1974 | Mortelli et al. | 209/75 |
| 3,814,943 | 6/1974 | Baker et al. | 250/550 |
| 3,820,068 | 6/1974 | McMillin | 235/455 |
| 3,916,194 | 10/1975 | Novak et al. | 250/338 |
| 3,959,630 | 5/1976 | Hogberg | 235/491 |
| 4,013,894 | 3/1977 | Foote et al. | 250/569 |
| 4,034,211 | 7/1977 | Horst et al. | 235/454 |
| 4,041,279 | 8/1977 | Foote | 235/454 |
| 4,066,910 | 1/1978 | Swift | 250/555 |
| 4,093,376 | 6/1978 | Rabindran et al. | 355/68 |
| 4,149,269 | 4/1979 | Abe et al. | 365/215 |
| 4,184,081 | 1/1980 | Bergamini | 250/556 |
| 4,217,487 | 8/1980 | Kjeer | 235/468 |
| 4,218,674 | 8/1980 | Brosow et al. | 340/149 A |
| 4,230,265 | 10/1980 | Casaly | 235/455 |
| 4,406,996 | 9/1983 | Oka | 340/674 |
| 4,423,415 | 12/1983 | Goldman | 340/825.34 |
| 4,450,348 | 5/1984 | Stockburger et al. | 235/380 |

FOREIGN PATENT DOCUMENTS

| | | |
|---|---|---|
| 2847756 | 8/1980 | Fed. Rep. of Germany . |
| 2190300 | 1/1974 | France . |
| 2229099 | 6/1974 | France . |
| 1463903 | 2/1977 | United Kingdom . |
| 1535340 | 12/1978 | United Kingdom . |
| 2018984 | 10/1979 | United Kingdom . |

OTHER PUBLICATIONS

IBM Tech. Disclosure Bulletin, vol. 15, No. 1, 6/72, p. 276.

Primary Examiner—Gene Z. Rubinson
Assistant Examiner—Robert G. Lev
Attorney, Agent, or Firm—Donald Brown; Robert M. Asher

[57] ABSTRACT

The present invention specifies a method for the verification of authenticity in a data carrier (1) by measuring permeability to an electromagnetic radiation in at least one region of the data carrier (1). Permeability is scanned over a regional area of the data carrier by means of a radiation detector (7) first in a calibration operation, in which the radiation intensity is adjusted, then in a reading operation at another position of the data carrier. The output signal of the detector (7) is coded and co-inscribed as additional information in a store of the data carrier with the information data during the initial inscribing of these data. In the reading and authenticity check scanning operation this information is compared with a corresponding additional information stored during the original data inscription.

7 Claims, 1 Drawing Figure

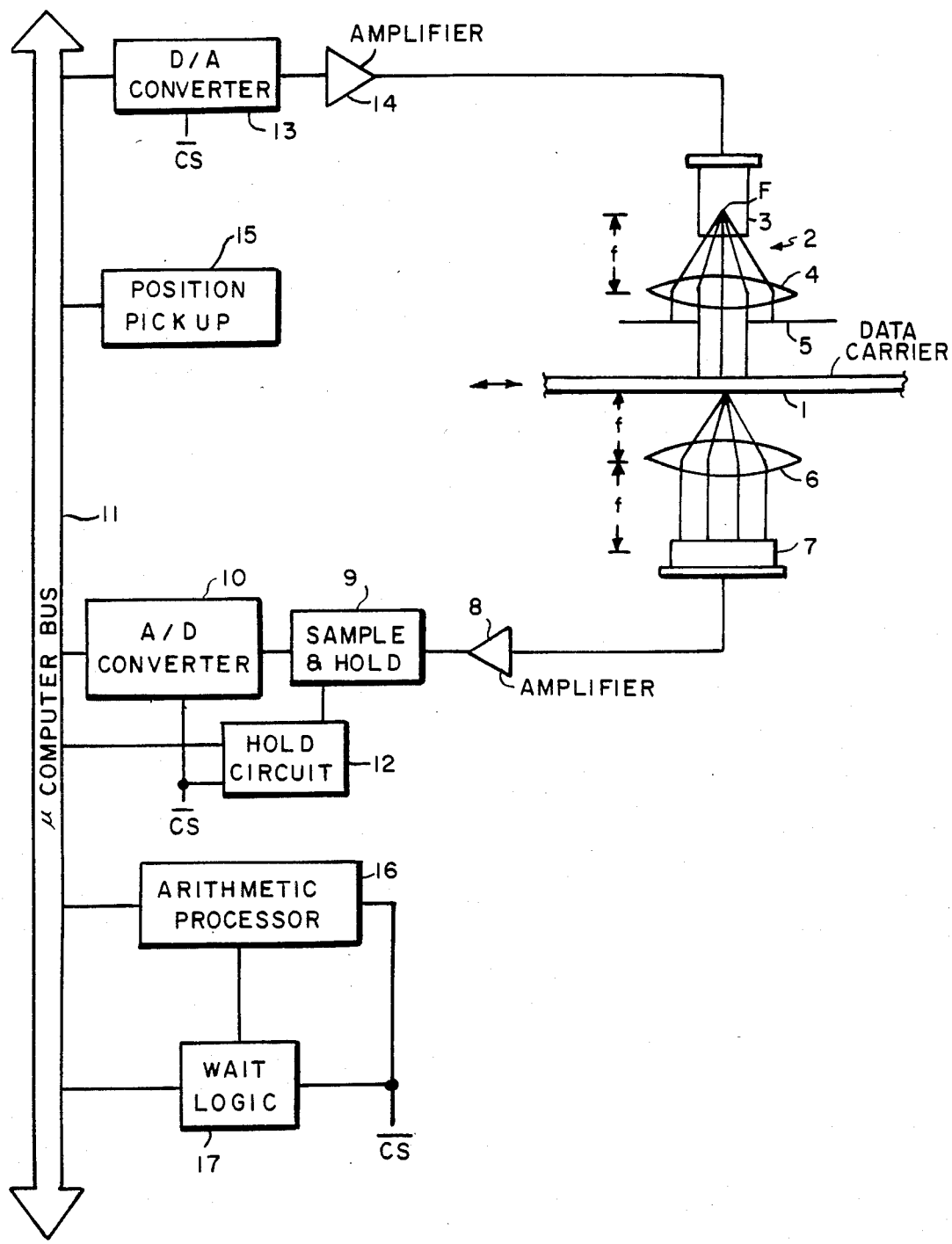

METHOD FOR THE DETECTION OF AUTHENTICITY IN A DATA CARRIER AND APPARATUS FOR APPLYING SAID METHOD

BACKGROUND OF THE INVENTION

This invention relates to a method for the detection of authenticity in a data carrier by measuring the permeability in respect of an electromagnetic radiation, preferably infra-red radiation, of at least one region of the data carrier. The invention also relates to apparatus for carrying out said method.

German OS No. 26 35 795 describes a data carrier with a really distributed random information in the form of magnetic fibres. A lamellar scanning trace is used for identification. In order to ensure that this lamellar trace is adhered to with maximum accuracy lateral stops or a self-centering device for the magnetic head by means of corresponding markings on the data carrier are provided. German OS No. 28 29 778 describes a data carrier which is provided with a linear trace of a material having a property which distinguishes it from the adjacent regions of the data carrier to provide a basis for identification. In both of these arrangements the degree of reproduceability and thus the accuracy of the authenticity test of such a data carrier depend on how accurately the trace is scanned. Even such factors as variations in temperature or variations in the humidity content of the data carrier are liable to give rise to false readings. German OS No. 28 47 756 describes a method for testing authenticity which uses permeability to infrared radiation as a critical parameter.

OBJECT OF THE INVENTION

It is a primary object of the present invention to provide a method which enables the data carrier to be tested for authenticity in a simple and exact manner. A further object of the invention is the provision of an apparatus suitable for carrying out said method.

SUMMARY OF THE INVENTION

In accordance with the invention a method is provided according to which permeability resulting from inherent properties of the data carrier is scanned over a region of the data carrier by means of a ray-detector and a code is formed of the detector output signal which is co-inscribed as additional information during the original inscription of data on the data carrier and compared with a corresponding additional information stored during the inscription when the data carrier is tested for authenticity.

In accordance with a further aspect of the invention an apparatus is provided which comprises a detector and a device for producing a code in relation with the output signal of the detector, an electromagnetic radiation source for application to at least one region of the data carrier and a receiver which in that region measures electromagnetic radiation permeating through the data carrier.

BRIEF DESCRIPTION OF THE DRAWINGS

An embodiment of the invention is hereinafter more particularly described by way of example with reference to the drawing.

The drawing is a diagrammatic representation of the apparatus for applying the invention.

The data carrier 1 is only partially indicated in sideview in the drawing. This data carrier is a card of the type generally used as credit-service or identity card designed to prove that the card itself is one of an authorised batch, who is the authorised card holder, and that the current user is the said authorized holder of the card. The apparatus, generally indicated at 2, in association with which the card is used, comprises a feed or card-intake mechanism of known type and not shown in the drawing, and includes a magnetic head for inscribing and/or reading data in a magnetic trace of the data carrier. The apparatus further comprises an optical system consisting of a focussing lens 4 and a light source 3 in the form of an infrared-light-emitting diode arranged at the focal point F of said light source. The optical axis of the optical system extends vertically of the plane and direction of feed of the data carrier 1. On that side which is directed towards the data carrier a shutter 5 is arranged in the ray path with a stop aperture of the order of magnitude of 1 to 22 mm diameter through which a defined beam of parallel rays is directed at one side of the data carrier. On the opposite side of the data carrier there is a receiver system consisting of a focussing lens 6 and a diode 7. Preferably the optical axis of lens 6 coincides with the optical axis of lens 4. The focussing lens 6 is arranged in such a way that its near-side focal point F conicides with the underside of the data carrier. The receiver 7 is arranged in the focal plane on the image side of the lens 6. The output of receiver 7 is adapted to be applied as input to an amplifier 8 of which the output is adapted to be applied to a sample and hold link 9. The output of this sample and hold link is adapted to be applied as input to an analog-digital converter 10 and the output of the latter is transmitted via busbar 11 to the computer. The computer is connected via busbar 11 with a hold logic 12 which is connected through its output terminal with the sample and hold link 9.

The light source 3 is connected on its input side to the computer via busbar 11, digital analog converter 13 and an amplifier 14 downstream of the latter. This amplifier can be adjusted from the exterior for adjusting the brightness of light source 3.

There is further provided a position pick-up 15 which can be connected to the computer via busbar 11 and which is capable of generating an INTERRUPT signal.

Finally the arrangement includes the provision of an arithmetical processor 16 for accelerating the arithmetical operations of the computer, which is also connected with the computer through the busbar 11. Wait logic 17 is connected to the computer via busbar.

In practical operation the data carrier 1 which is to be checked is inserted into the apparatus 2. In order to cut out external influences potentially detrimental to the verification process and arising, for example from a worn condition of the data carrier, aging of the light source or the like, the first step of the operation consists of a calibration process in which the brightness of light source 3 is set to a desired working point of the receiver 7 by means of an adjusting member. For preference the setting is so adjusted that the value produced by the analog digital converter is at ½ max.

This is followed by the actual evaluation process. For initial activation of the data carrier 1 the appropriate data are recorded, or inscribed, in the magnetic trace of the data carrier by means of the magnetic head, not shown, controlled by the computer. At certain points of the data carrier which are determined by pre-adjustment of the position pick-up 15 and which can be correlated with the bit positions which occur during data inscription, the pick-up 15 issues an interrupt signal which is transmitted via busbar 11 to the computer and causes activation of the sample and hold line 9 via hold logic 12 into the hold state, the hold logic 12 practically translating the information from the computer. The output of receiver 7 always feeds through amplifier 8 an analog input signal to the sample and hold link in relation with the amount of radiation which is transmitted through the data carrier at the point thereof which is being irradiated at any given moment. As soon as the sample and hold link has been switched to the hold state by the INTERRUPT signal it applies the analog value corresponding to the moment at which the said INTERRUPT signal was received to the analog digital converter 10 which feeds a corresponding digital signal to the computer where it is stored. This process is repeated, preferably several times, for example 8 to 10 times in the course of the passage of the data carrier through the apparatus so that radiation permeability is measured at a plurality of relatively spaced apart points of the data carrier. At the end of the recording or inscription of information data relating to identification, authorisation and value, the authenticity test data which were obtained through the analog digital converter 10 and intermediately stored in the computer are inscribed as additional information in the magnetic trace of the data carrier 1.

The position pick-up 15 is associated with a recognition or detector device, not shown, for example a contact switch, which triggers the working cycle of the pick-up 15 when the data carrier 1 is inserted into a predetermined position in the apparatus 2. This ensures that the working cycle of position pick-up 15 always occurs in such a way that the INTERRUPT signals are issued at equidistant points relative to a trigger characteristic of the data carrier, for example one of its marginal edges.

During the reading, or scanning of such an activated and inscribed data carrier the recorded data are scanned by the recording/reading head, not shown, and fed into the computer. This scanning process also includes the additional information which during the initial inscription of the data carrier was fed into the computer through the analog digital converter as hereinbefore described and co-recorded with the basic information data on the data carrier. The data carrier is again exposed to the radiation source of the above described device. In accordance with the INTERRUPT signals issued by pick-up 15 signals are produced at the same points of the data carrier as during the original recording in relation with local permeability conditions and these signals are again stored in the computer.

This is followed by a comparison of the additional information recording with the new signals produced in the reading or scanning process reflecting present permeability conditions. If the data coincide the data carrier is identified as being part of the authorised batch and thus as being genuine or authentic. If the data disagree the apparatus identifies the card as being forgery.

It was found that the permeability of a data carrier in respect of electromagnetic radiation, particularly infrared radiation, provides an information pattern which is highly characteristic for each individual data carrier. Even if, due to wear and dirt, the permeability of the data carrier alters at some of the previously evaluated points or regions, the characteristic obtained by measuring a plurality of, for example 8 to 10 such points or regions still remains so unequivocally characterizing that a forgery can be clearly detected. In order to avoid a data carrier being rejected on the strength of minor variations in permeability at localized points of the data carrier due to normal wear the comparison of the originally measured additional information which was picked out during reading with permeability actually measured during testing at the various individual points is made by a threshold or trigger value calculation by means of the arithmetical processor 16 in accordance with the following algorithm;

$$G_{xy} = \frac{\frac{1}{n-1}\left(\Sigma x_i y_i - \frac{1}{n}\Sigma x_i \Sigma y_i\right)}{\sqrt{\frac{\Sigma x_i^2 - n\bar{x}^2}{n-1}} \sqrt{\frac{\Sigma y_i^2 - n\bar{y}^2}{n-1}}}$$

in which n=number of values, x=measured value, y=picked out value.

The card is recognised as being genuine if the threshold value of potentially recorded deviations is inferior or equal to $G_{xy}$.

It should be understood that the above description is in no way limitative and that many modifications may be brought to the embodiments disclosed without departing from the true spirit of the invention.

What is claimed is:

1. A method for detecting the authenticity of a data carrier having measurable permeability and having authenticity data stored thereon comprising the steps of directing electromagnetic radiation at said data carrier at a predetermined region thereof, detecting said radiation passing through said data carrier, adjusting the intensity of the electromagnetic radiation directed at said data carrier so that the detected amount of said radiation corresponds to a predetermined intensity level, thereafter maintaining the intensity of the electromagnetic radiation constant while scanning a second region of said data carrier by directing said electromagnetic radiation at said second region of said data carrier and measuring the permeability of said second region of said data carrier by measuring the electromagnetic radiation passing through said data carrier, generating a coded signal from said measured electromagnetic radiation, reading out said authenticity data and making an authenticity test by comparing said coded signal with said read out authenticity information to determine if the data carrier is authentic.

2. The method of claim 1 in which the electromagnetic radiation is light radiation.

3. The method of claim 1 wherein during the authenticity test the permeability is measured at a number of points in said second region of the data carrier and the authenticity and data retrieved therefrom for comparison with actual data corresponding to the permeability values measured during the authenticity test, and wherein said actual measured data are compared with said retrieved authenticity data by forming a threshold value from said measured data by application of the following formula:

$$G_{xy} = \frac{\frac{1}{n-1}\left(\Sigma x_i y_i - \frac{1}{n}\Sigma x_i \Sigma y_i\right)}{\sqrt{\frac{\Sigma x_i^2 - n\bar{x}^2}{n-1}} \sqrt{\frac{\Sigma y_i^2 - n\bar{y}^2}{n-1}}}$$

in which n=number of points, x=actual data, Y=retrieved data and the card is recognised as being genuine and authentic if the threshold value of a potentially measured deviation is inferior or equal to $G_{xy}$.

4. A method for detecting the authenticity of a data carrier, wherein said electromagnetic radiation is passed through said data carrier at a predetermined first region thereof, the passing radiation is detected and the intensity of said electromagnetic radiation is adjusted such that the detected amount of said passing radiation corresponds to a predetermined value, thereafter the intensity is kept constant at the adjusted intensity level and a permeability of said data carrier to said electromagnetic radiation having said adjusted intensity level is scanned a number of points in a second region of said data carrier, a code is formed of said scanned permeability values at said points and said code is compared with additional information stored on said data carrier by forming a correlation value from said scanned permeability values and said additional information, and said data carrier is recognised as being authentic if said correlation value is equal to or greater than a predetermined value.

5. Apparatus for detecting the authenticity of a data carrier, comprising means for receiving said data carrier in a receiving plane, an electromagnetic radiation source disposed on a first side of said receiving plane, said radiation source having an adjustable intensity; a receiver device disposed at a second side of said receiving plane opposite to said first side for providing a signal corresponding to the electromagnetic radiation transmitted through said data carrier at an output thereof, adjustment means connected with said radiation source and said receiver device for adjusting the intensity of said radiation source as a function of said signal, a coder device connected with said output of said receiver device for producing a code from the receiver output signal, reading means for reading additional information stored on said data carrier from said data carrier, and a comparator connected with said coder device and said reading means for comparing said additional information with said code.

6. The apparatus of claim 4, wherein said radiation source is an infrared source comprising a focussing lens between said receiver device and said receiving plane, said focussing lens having its focal point coinciding with said receiving plane.

7. Apparatus for detecting the authenticity of a data carrier comprising means for receiving said data carrier in a receiving plane, a light source disposed on a first side of said receiving plane, said source having an adjustable brightness, a receiver device disposed at a second side of said receiving plane opposite to said first side for providing a signal corresponding to the light transmitted through said data carrier at a plurality of points at an output thereof, reading means for reading additional information stored on said data carrier from said data carrier, adjustment means connected with said source and said receiver device for adjusting the brightness of said source as a function of said signal, a coder device connected with said output of said receiver device and said reading means for forming a correlation value from said detected light and said additional information, and a comparator connected with said coder device for comparing said correlation value with a predetermined threshold value.

* * * * *